United States Patent Office 2,812,354
Patented Nov. 5, 1957

2,812,354

POLYENEALDEHYDES AND PROCESS FOR PREPARING SUCH COMPOUNDS

Otto Isler, Marc Montavon, and Rudolf Rüegg, Basel, and Paul Zeller, Neuallschwil, Switzerland, assignors to Hoffmann-La Roche Inc., Nutley, N. J., a corporation of New Jersey No Drawing. Application August 10, 1955, Serial No. 527,645

Claims priority, application Switzerland August 16, 1954

13 Claims. (Cl. 260—598)

The process in accordance with the invention is characterized by the fact that an aldehyde of the formula

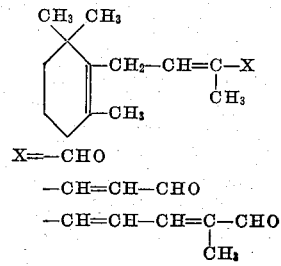

$X=$ —CHO
—CH=CH—CHO
—CH=CH—CH=C—CHO
   |
   CH₃ in which the aldehyde group may be acetalized, is subjected to a Wohl-Ziegler reaction [cf. C. Djerassi, Chem. Reviews, vol. 43 (1948), page 271] and the halogen compound formed is heated with a tertiary base, as a result of which hydrogen halide is split off with allyl rearrangement.

The aldehydes used as starting materials are prepared as follows:

*4-[2',6',6'-trimethyl-cyclohexen-(1')-yl]-2-methyl-buten-(2)-al-(1)*

By glycide ester synthesis of β-ionone and chloroacetic ester, followed by treatment of the glycide ester with alkali.

*6[2',6',6'-trimethyl-cyclohexen-(1')-yl]-4-methyl-hexa-dien-(2,4)-al-(1)*

4 - [2',6',6' - trimethyl - cyclohexen - (1') - yl] - 2-methyl - buten - (2) - al - (1) is acetalized with ethylorthoformate in the presence of a small amount of p-toluenesulfonic acid. The diethylacetal produced is thereupon condensed with ethylvinylether in the presence of zinc chloride. The 6-[2',6',6'-trimethyl-cyclohexen-(1')-yl]-4-methyl-hexen-(4)-ether-(3)-acetal-(1) is heated to 100° C. with acetic acid and sodium acetate, thus effecting hydrolysis and the splitting off of alcohol (see copending application Ser. No. 435,936, filed June 10, 1954, now U. S. Patent No. 2,730,549, issued January 10, 1956).

*8-[2',6',6'-trimethyl-cyclohexen-(1')-yl]-2,6-dimethyl-octatrien-(2,4,6)-al-(1)*

6 - [2',6',6' - trimethyl - cyclohexen - (1') - yl] - 4-methyl - hexadien - (2,4) - al - (1) is acetalized with ethylorthoformate in the presence of a small amount of p-toluenesulfonic acid. The diethylacetal produced is thereupon condensed with ethyl-propenylether in the presence of zinc chloride. The 8 - [2',6',6' - trimethyl-cyclohexen - (1')-yl] - 2,6 - dimethyl - octadiene - (4,6)-ether - (3) - acetal - (1) produced is heated at 100° C. with acetic acid and sodium acetate, thus effecting hydrolysis and the splitting off of alcohol (see copending application Ser. No. 435,936, filed June 10, 1954, now U. S. Patent No. 2,730,549, issued January 10, 1956).

The acetals are prepared from the aldehydes in accordance with known methods, for instance with orthoformates (see copending application Ser. No. 435,936, filed June 10, 1954, now U. S. Patent No. 2,730,549, issued January 10, 1956.

The first step in accordance with the invention consists of the halogenation of the initial aldehyde or acetal at the methylene group of the side chain. The halogenation is effected in the known manner in accordance with the Wohl-Ziegler reaction. There is preferably used for this purpose N-bromosuccinimide or N-bromoacetamide in an inert solvent such as carbon tetrachloride, chloroform, benzene, methylene chloride, etc. It is particularly advantageous to work in methylene chloride at a temperature of between 0 and 30° C. The halogenation agent is preferably used in an excess of approximately 10%. The reaction can be accelerated by the addition of catalysts, such as dibenzoylperoxide, or by irradiation with light. When N-bromosuccinimide is used, sodium bicarbonate and calcium oxide are advisedly added to the reaction mixture. After completion of the reaction, which takes 15 minutes to 4 hours depending on the temperature, the mixture is filtered and the solvent, if desired, is removed in vacuum.

The halogen compounds obtained in this manner, which have the following probable formula

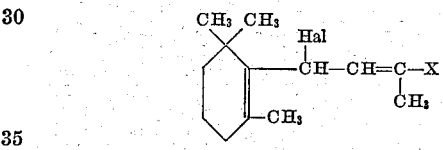

(in which X has the same meaning as above)

are not very stable and darken upon storage. They are advisedly immediately employed without purification.

The second step of the process is the splitting off of hydrogen halide with allylic rearrangement. It is effected by the addition of an excess of a tertiary base such as quinoline, pyridine, dimethylaniline, collidine, etc., and by heating the mixture. Preferably heating is effected with quinoline for 2 to 6 hours in a nitrogen atmosphere at 100° C.

The reaction mixture is advisedly worked up by the addition of ice cold excess dilute acid and extraction of the product with an organic solvent, for instance petroleum-ether.

In the acid treatment, acetal groups can be entirely or partially saponified.

The products of the general formula

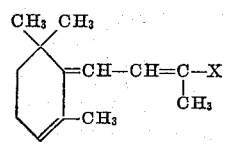

(in which X has the same meaning as above)

obtained are purified in the customary manner, for instance by distillation, crystallization or chromatographic treatment. They have characteristic absorption maxima in the ultraviolet spectrum. Due to the cis-trans-isomerism at the double bond, there are various spatial forms of these aldehydes or acetals; thus in the case of 6 - [2',6',6' - trimethyl - cyclohexen - (2') - ylidene]-4 - methyl - hexadien - (2,4) - al - (1) two different phenylsemicarbazones are isolated. The following table contains a summary of the phenylsemicarbazones corresponding to the aldehydes formed in accordance with the invention:

*Phenylsemicarbazones of the aldehydes*

| | Melting point, °C. | Ultraviolet absorption maxima in petroleum-ether | |
|---|---|---|---|
| | | Max. mµ | $E_1^1$ |
| 4-[2',6',6'-trimethyl-cyclohexen-(2')-ylidene]-2-methyl-buten-(2)-al-(1) | 160–161 | 339; 354 | 1,870; 1,590 |
| 6-[2',6',6'-trimethyl-cyclohexen-(2')-ylidene]-4-methyl-hexadien-(2,4)-al-(1): | | | |
| (A) | 184–186 | 366; 386 | 2,330; 2,160 |
| (B) | 164–166 | 362; 382 | 2,140; 1,800 |
| 8-[2',6',6'-trimethyl-cyclohexen-(2')-ylidene]-2,6-dimethyl-octatrien-(2,4,6)-al-(1) | 198–201 | 372.5; 393; 416.5 | 1,690; 2,575; 2,360 |

The aldehydes which can be prepared in accordance with the invention or their acetals represent valuable intermediates for the preparation of carotenoids such as for instance 4,4'-dioxycarotene and bisdehydro-β-carotene [nomencl. according to Karrer, see Chem. and Eng. News: 24, 1235–6 (1946)]; 4-[2',6',6'-trimethylcyclohexen-(2')-ylidene]-2-methyl-buten-(2)-al-(1) and its acetals have pleasant fragrances and can therefore be used as components in perfume mixtures (see copending applications Ser. Nos. 553,211 and 553,217, both filed December 15, 1955).

The 6-[2',6',6'-trimethyl-cyclohexen-(2')-ylidene]-4-methyl-hexadien-(2,4)-al-(1) can be converted into 8-[2',6',6'-trimethyl-cyclohexen-(2')-ylidene]-2,6-dimethyl-octatrien-(2,4,6)-al-(1) in the following manner: it is acetalized by means of ethylorthoformate in the presence of a small amount of p-toluene sulfonic acid; the diethylacetal produced is thereupon condensed with ethylpropenyl ether in the presence of zinc chloride; the 8-[2',6',6'-trimethyl-cyclohexen-(2')-ylidene]-2,6-dimethyl-octadiene-(4,6)-ether-(3)-acetal-(1) obtained is heated with acetic acid and sodium acetate at 100° C., whereby 8-[2',6',6'-trimethyl-cyclohexen-(2')-ylidene]-2,6-dimethyl-octatrien-(2,4,6)-al-(1) is formed by hydrolysis and splitting off of alcohol (see copending application Ser. No. 527,647, filed August 10, 1955).

The 4-[2',6',6'-trimethyl-cyclohexen-(2')-ylidene]-2-methyl-buten-(2)-al-(1), in the same reaction but with the use of ethylvinylether instead of ethylpropenylether, gives 6-[2',6',6'-trimethyl-cyclohexen-(2')-ylidene]-4-methyl-hexadien-(2,4)-al-(1) (see copending aplication Ser. No. 527,646, filed August 10, 1955).

EXAMPLE 1

30 parts by weight 4-[2',6',6'-trimethyl-cyclohexen-(1')-yl]-2-methyl-buten-(2)-al-(1) in 210 parts by weight of methylene chloride are cooled with 13.5 parts by weight sodium bicarbonate and 9 parts by weight calcium oxide to 0° C. while stirring. There are then added 28 parts by weight N-bromosuccinimide and the temperature is maintained for 3 hours at 5° to 10° C. by intermittent cooling. The mixture after some time assumes a yellow to red color and then becomes slowly colorless again. It is thereupon filtered, 30 parts by weight of quinoline are added, and the methylenechloride is removed in vacuum. Thereupon 30 parts by weight quinoline are again added and the mixture is warmed for 2 hours under nitrogen on a steam bath. 350 parts by weight of petroleum-ether (B. P. 30 to 60° C.) are then added, followed by pouring over 250 parts by weight of 3 N sulfuric acid and ice while stirring. The insoluble resin is filtered off and also the aqueous layer is removed and the petroleum-ether solution is washed, once with water, once with dilute sodium bicarbonate solution and once with water again. After the drying of the petroleum-ether solution over sodium sulfate and concentration, 29.4 parts by weight crude 4-[2',6',6'-trimethyl-cyclohexen-(2')-ylidene]-2-methyl-buten-(2)-al-(1) are obtained; this product is distilled for its purification in a Hickmann flask at a high vacuum; B. P.$_{0.03}$ 90° C. A completely pure product is obtained if the compound is again distilled in a Vigreaux column (30 cm.). The aldehyde forms a yellow, thinly liquid oil, $n_D^{22}$=1.6152; ultraviolet maximum at 318 mµ; $E_1^1$ 1610 (in petroleum-ether).

EXAMPLE 2

34 parts by weight 6-[2',6',6'-trimethyl-cyclohexen-(1')-yl]-4-methyl-hexadien-(2,4)-al-(1) are treated in the manner indicated in Example 1 in 210 parts by weight methylenechloride with 13.5 parts by weight sodium bicarbonate, 9 parts by weight calcium oxide and 28 parts by weight N-bromosuccinimide, the bromination temperature being 20 to 25° C. in contradistinction to Example 1. There are obtained 19 parts by weight of a crude product, which is purified by chromatographic adsorption on 30-times the quantity of aluminum oxide (deactivated with 2% water) with petroleum-ether and petroleum-ether-ether mixtures. The 6-[2',6',6'-trimethyl-cyclohexen-(2')-ylidene]-4-methyl-hexadien-(2,4)-al-(1) obtained in this manner is a mixture of isomers. By crystallization from petroleum-ether at −70° C. there can be obtained a form in yellow prisms, melting point 73 to 74° C. ultraviolet maxima 353 mµ, $E_1^1$ 2360; 372 mµ, $E_1^1$ 2200 (in petroleum ether). The oily isomer can be in part transformed into the crystalline isomer by heating for 5 hours at 100° C. with acetic acid and sodium acetate; by repeated treatment of the mother liquors, practically the entire quantity can be obtained in the form of the crystalline isomer.

EXAMPLE 3

40 parts by weight 8-[2',6',6'-trimethyl-cyclohexen-(1')-yl]-2,6-dimethyl-octatrien-(2,4,6)-al-(1) are treated, in the manner indicated in Example 1, in 210 parts by weight methylene chloride with 13.5 parts by weight sodium bicarbonate, 9 parts by weight calcium oxide and 28 parts by weight N-bromosuccinimide, the bromination temperature, differing from Example 1, being 25 to 30° C. There are obtained 22 parts by weight of a crude product which is purified by chromatographic absorption. The 8-[2',6',6'-trimethyl-cyclohexen-(2')-ylidene]-2,6-dimethyl-octatrien-(2,4,6)-al-(1) obtained has two maxima in the ultraviolet absorption spectrum, namely: 382 mµ, $E_1^1$ 1615; 403 mµ $E_1^1$ 1445.

EXAMPLE 4

20.5 parts by weight of 4-[2',6',6'-trimethyl-cyclohexen-(1')-yl]-2-methyl-1,1-diethoxy-butene-(1) in 105 parts by weight methylene chloride are cooled to 0° C. while stirring, with 6.75 parts by weight sodium bicarbonate and 4.5 parts by weight calcium oxide. There are then added 14 parts by weight N-bromosuccinimide and one thereupon proceeds in the manner described in Example 1. The crude product before the distillation is heated for 3 hours on a steam bath with 150 parts by weight glacial acetic acid, 15 parts by weight sodium acetate and 7 parts by weight of water in order to completely saponify the acetal. Thereupon it is diluted with 1,000 parts by weight of water and extracted with petroleum ether and the petroleum ether layer is thereupon washed with dilute sodium bicarbonate solution and water. After the drying of the petroleum-ether solution over sodium sulfate and evaporation, there are obtained 29.1 parts by weight of crude 4-[2',6',6'-trimethyl-cyclohexen-(2')-ylidene]-2-methyl-buten-(2)-al-(1).

We claim:
1. A process which comprises halogenating by means of an N-haloamide a member of the group consisting of 4-[2',6',6'-trimethyl-cyclohexen-(1')-yl]-2-methyl-buten-(2)-al-(1), 6-[2',6',6'-trimethyl-cyclohexen-(1')-yl]-4-methyl-hexadien-(2,4)-al-(1), 8-[2',6',6'-trimethyl-cyclohexen-(1')-yl]-2,6-dimethyl-octa- trien - (2,4,6) - al - (1) and acetals thereof and heating the halogen compound formed with a tertiary base thereby dehydrohalogenating with concomitant allyl rearrangement.

2. A process which comprises halogenating by means of an N-haloamide a member of the group consisting of 4 - [2',6',6'- trimethyl - cyclohexen - (1') - yl] - 2 - methyl-buten - (2) - al - (1), 6 - [2',6',6'-trimethyl - cyclohexen- (1') - yl] - 4 - methyl - hexadien - (2,4) - al - (1),8 - [2',6',6'-trimethyl - cyclohexen - (1') - yl] - 2,6 - dimethyl - octa-trien - (2,4,6) - al - (1) and acetals thereof.

3. A process which comprises heating with a tertiary base a compound selected from the group consisting of 4 - [2',6',6'- trimethyl - cyclohexen - (1') - yl] - 2 - methyl-buten - (2) - al - (1), 6 - [2',6',6'-trimethyl - cyclohexen- (1') - yl] - 4 - methyl - hexadien - (2,4) - al - (1),8 - [2',6',6'-trimethyl - cyclohexen - (1') - yl] - 2,6 - dimethyl - octa-trien - (2,4,6) - al - (1) and acetals thereof, said compounds halogenated on the side chain, to produce, respectively, a member of the group consisting of 4-[2',6',6'-trimethyl - cyclohexen - (2') - ylidene] - 2 - methyl - buten-(2) - al - (1), 6 - [2',6',6'- trimethyl - cyclohexen - (2')-ylidene] - 4 - methyl - hexadien - (2,4) - al - (1) and 8-[2',6',6'- trimethyl - cyclohexen - (2') - ylidene] - 2,6 - dimethyl - octatrien - (2,4,6) - al - (1).

4. 6 - [2',6',6'- trimethyl - cyclohexen - (2') - ylidene]-4 - methyl - hexadien - (2,4) - al - (1).

5. A process as in claim 1 wherein the halogenating agent is N-bromosuccinimide.

6. A process as in claim 1 wherein the halogenating agent is N-bromoacetamide.

7. A process as in claim 3 wherein the tertiary base is quinoline.

8. A process which comprises halogenating 4 - [2',6',6'-trimethyl - cyclohexen - (1') - yl] - 2 - methyl - buten - (2)-al - (1) with an N-haloamide and heating the halogenated compound formed with a tertiary base to produce 4 - [2',6',6'- trimethyl - cyclohexen - (2') - ylidene]-2 - methyl - buten - (2) - al - (1).

9. A process as in claim 8 wherein the halogenating agent is N-bromosuccinimide, and the tertiary base is quinoline.

10. A process which comprises halogenating 6-[2',6',6'-trimethyl - cyclohexen - (1') - yl] - 4 - methyl - hexadien-(2,4) - al - (1) with an N-haloamide and heating the halogenated compound formed with a tertiary base to produce 6 - [2',6',6'- trimethyl - cyclohexen - (2') - ylidene] - 4 - methyl - hexadien - (2,4) - al - (1).

11. A process as in claim 10 wherein the halogenating agent is N-bromosuccinimide and the tertiary base is quinoline.

12. A process which comprises halogenating 8-[2' 6',6'-trimethyl - cyclohexen - (1') - yl] - 2,6 - dimethyl - octa-trien - (2,4,6) - al - (1) with an N-haloamide and heating the halogenated compound formed with a tertiary base to produce 8-[2',6',6'-trimethyl-cyclohexen-(2')-yl-idene]-2,6-dimethyl-octatrien-(2,4,6)-al-(1).

13. A process as in claim 12 wherein the halogenating agent is N-bromosuccinimide and the tertiary base is quinoline.

No references cited.